Mar. 3, 1925. 1,528,127
F. MÜLLER
MACHINE FOR AND METHOD OF TURNING BLANKS
Filed Sept. 9, 1921 5 Sheets—Sheet 1

Fig. 1ª

Inventor
Friederich Müller,
By Wayne B Wells
Attorney

Mar. 3, 1925. 1,528,127
F. MÜLLER
MACHINE FOR AND METHOD OF TURNING BLANKS
Filed Sept. 9, 1921 5 Sheets-Sheet 3
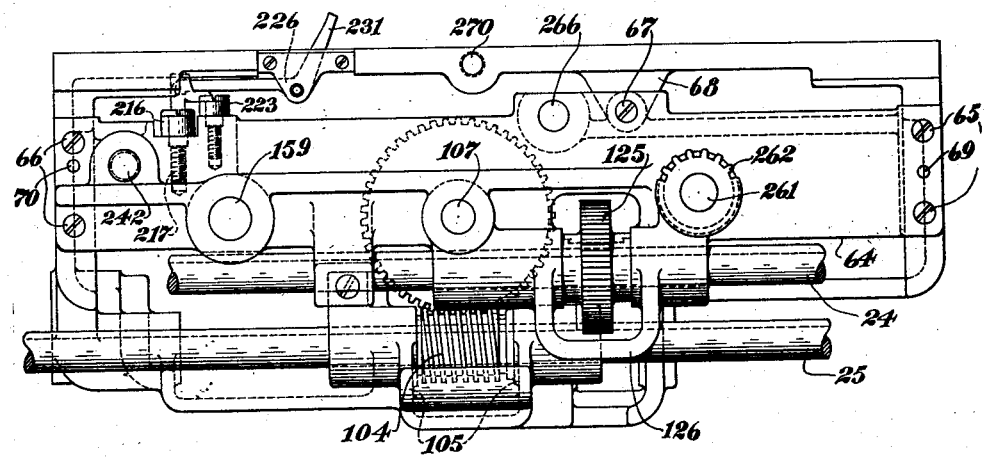
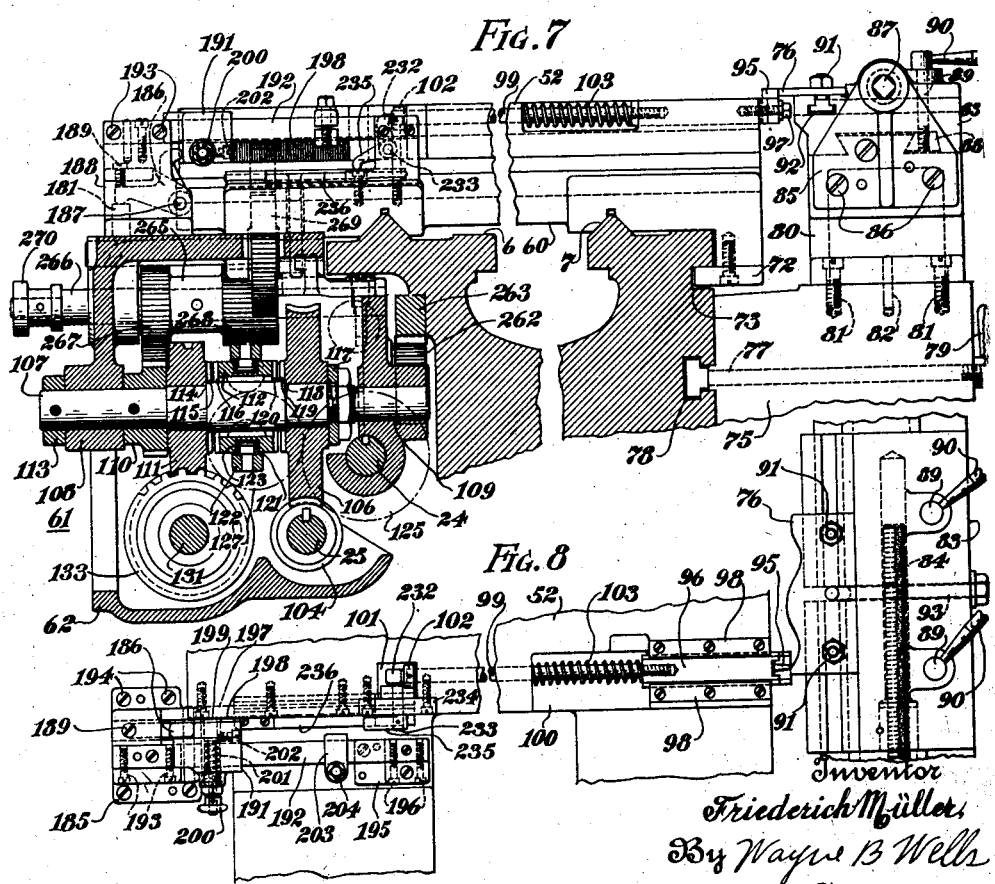

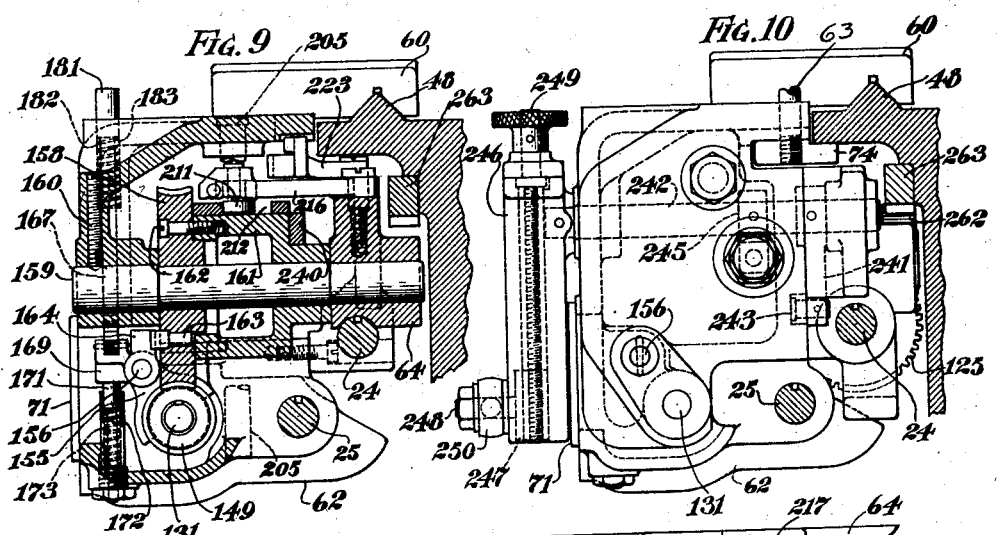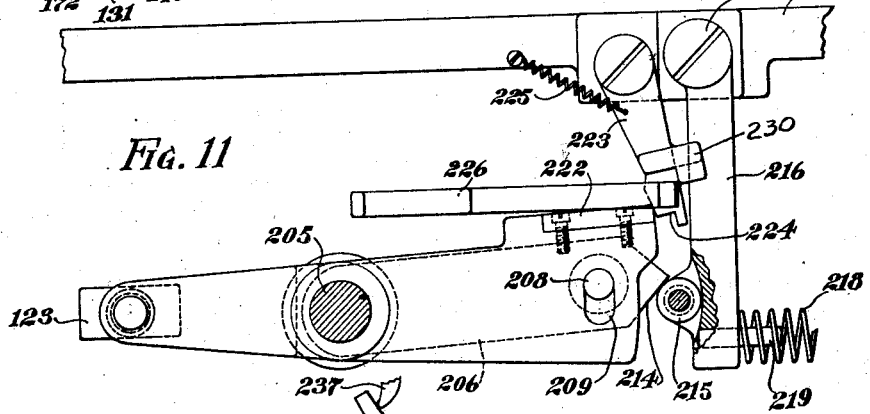

Mar. 3, 1925.
F. MÜLLER
MACHINE FOR AND METHOD OF TURNING BLANKS
Filed Sept. 9, 1921
1,528,127
5 Sheets-Sheet 5
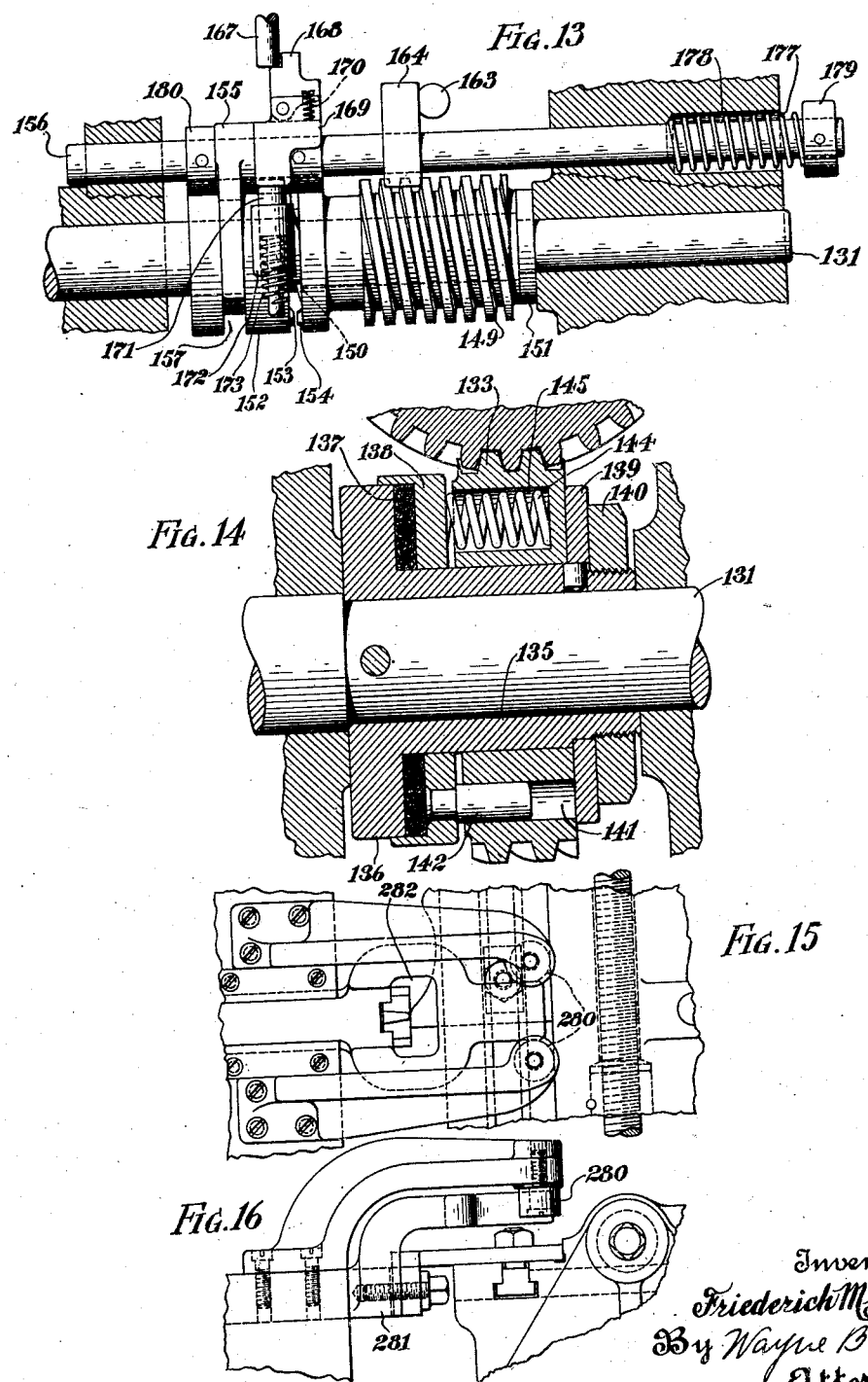

Patented Mar. 3, 1925.

1,528,127

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

MACHINE FOR AND METHOD OF TURNING BLANKS.

Application filed September 9, 1921. Serial No. 499,429.

*To all whom it may concern:*

Be it known that I, FRIEDERICH MÜLLER, a citizen of the United States, residing at Hartford, in the county of Hartford and State of Connecticut, have invented certain new and useful Improvements in a Machine for and Method of Turning Blanks, of which the following is a specification.

My invention relates to machines for and methods of turning blanks and particularly to machines for and methods of automatically turning blanks to any predetermined contour.

One object of my invention is to provide a machine that shall automatically control the transverse and longitudinal movements of a cutting tool with respect to a rotating blank for cutting the blank to any predetermined contour.

Another object of my invention is to provide a method that shall comprise steps for variably reciprocating a cutting tool while effecting longitudinal feeding movements of the cutting tool along the blank between the reciprocating movements thereof.

Another object of my invention is to provide a machine of the above indicated character that shall continuously rotate a blank while reciprocating and longitudinally moving a cutting tool with respect to the blank and that shall vary the reciprocating movements to cut the blank to any predetermined contour.

A further object of my invention is to provide a machine that shall continuously rotate a blank while effecting transverse movements of a slide carrying a cutting tool and that shall also be provided with a former member mounted adjacent to the slide and a slidable former pin mounter on the slide for engaging the former member to limit the transverse feeding movement of the slide and cutting tool and for automatically reversing the direction of movement of the slide and the tool.

More specifically my invention comprises a machine for and method of turning blanks such for example as may be used in the relieving machines disclosed in my copending applications Serial No. 286,524, filed March 31st, 1919, and Serial No. 469,266, filed May 13th, 1921. The blank is preferably continuously rotated and a cutting tool is mounted on a transversely movable slide adjacent to the rotating blank. The slide is mounted on a carriage which is longitudinally movable with respect to the blank. Means is provided for transversely feeding and withdrawing the slide with respect to the rotating blank, for limiting the feeding movement in accordance with a former member, and for reversing the direction of movement of the slide. After a predetermined withdrawal movement of the slide and tool, the slide movement is automatically stopped, a longitudinal feeding movement of the carriage is effected and a transverse feeding movement of the slide is again effected.

In a machine constructed in accordance with my invention the blank is continuously rotated in any suitable manner and the speed of rotation may be varied at will. A slide, which is transversely movable with respect to the rotating blank, carries a cutting tool and a yieldable former pin. The yieldable former pin cooperates with a former member, which is mounted on the frame of the machine, for limiting the feeding or cutting movement of the tool and slide. The former member may have any predetermined variable contour and serves to guide the cutting tool to cut a similar contour on the rotating blank. The transversely movable slide is mounted on a carriage which is adapted to move longitudinally with respect to the rotating blank. The slide is operated in a transverse direction to effect either a feeding or a withdrawing movement by means of a screw shaft which is mounted on the carriage. Two sets of gearing are provided for so connecting the slide feed shaft to the blank rotating means as to effect either a feeding or a withdrawing movement. A clutch member of any suitable type is provided for selectively connecting either of the two sets of gearing to the feed shaft. The clutch member is automatically controlled by a cam member which in turn is controlled by the movement of the slide. Normally, during the transverse feeding movement of the tool and slide, the clutch member is subject to a resilient force tending to move it from a feeding position to a position for effecting a withdrawal movement of the tool and slide. Near the end of the transverse feeding movement the yieldable former pin which is mounted on the slide engages the former member and releases a trip mechanism which holds the clutch member in the feeding position. The clutch member is automatically operated to disconnect one set of gearing from the slide feed shaft and to connect the other set of gearing to such shaft. Thus, the cutting or feeding movement of the tool is automatically stopped and a withdrawal movement is effected.

After a predetermined withdrawal of the slide and the cutting tool, a cam shaft is released which serves to effect one rotation of the above mentioned cam member. The cam shaft first releases a latch mechanism that normally holds the cam member in a set position and then connects the cam member to a source of power for rotating it. The rotation of the cam member effects movement of the clutch member from the withdrawal position to the feeding position. Preferably, between the withdrawal movement and the feeding movement the cam member operates a feeding mechanism to effect a longitudinal feeding movement of the carriage. Although such longitudinal feeding movement of the carriage is presumed to take place, after the stopping of the withdrawal movement and before the starting of the feeding movement, such longitudinal movement of the carriage may take place either at the end of the withdrawal movement or at the beginning of the feeding movement of the slide and the tool. The cam member when moved to the feeding position is again subject to a resilient force tending to move it to the withdrawal position. The above cycle of operations is repeatedly carried on to cut the blank in accordance with the contour of the former member.

The former member may have any suitable contour consisting either of straight lines or variable lines and may consist in part of portions very steeply inclined with respect to the axis of the rotating blank. By reason of the reciprocating movement of the cutting tool, it is possible to follow a contour consisting in part of relatively steep portions.

In the accompanying drawings:

Figure 1 is a front elevational view of a machine embodying my invention.

Fig. 1ª is a partial plan view of the machine.

Fig. 6 is the rear elevational view of the mechanism shown in Fig. 4.

Fig. 7 is a sectional view along the line 7—7 of the mechanism shown in Fig. 5.

Fig. 8 is a partial plan view of the machine showing the relation of the former member to the former pin.

Fig. 9 is a section along the line 9—9 of the mechanism shown in Fig. 4.

Fig. 10 is an end elevational view of the mechanism shown in Fig. 4.

Figs. 11 and 12 are respectively plan and side elevational views of the trip mechanism which is operated by the former pin near the end of the feeding or cutting movement of the slide and tool.

Fig. 13 is a detail view of the cam shaft.

Fig. 14 is a detail view of a friction clutch in the withdrawing gearing.

Figs. 15 and 16 are detail views of a modified former pin mechanism.

Figure 1:
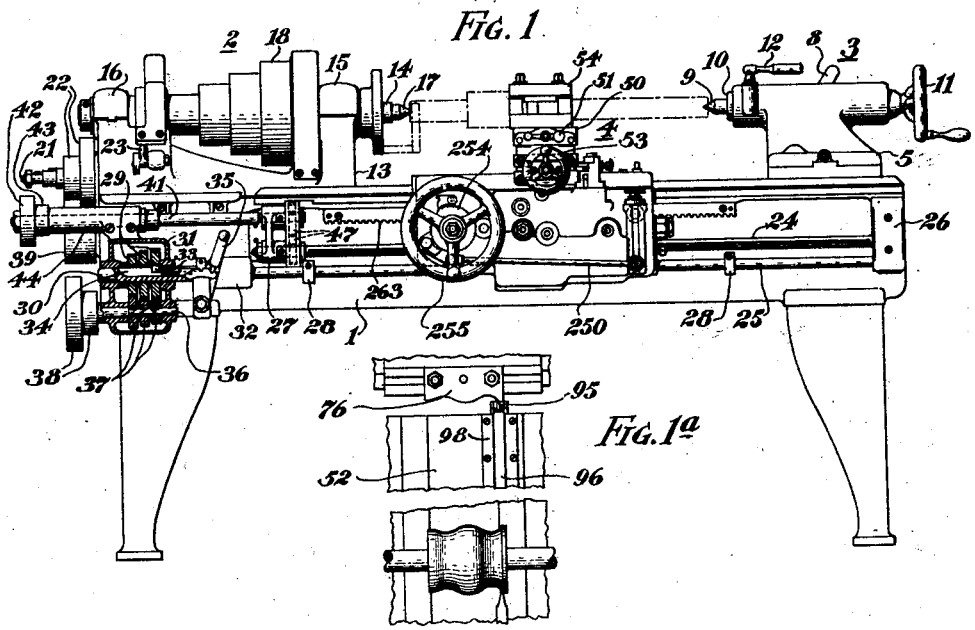
Figure 2:
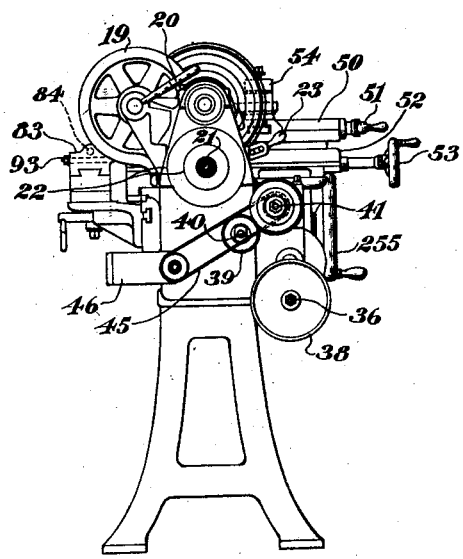
Fig. 2 is a left-end elevational view of the machine shown in Fig. 1.
Figure 3:
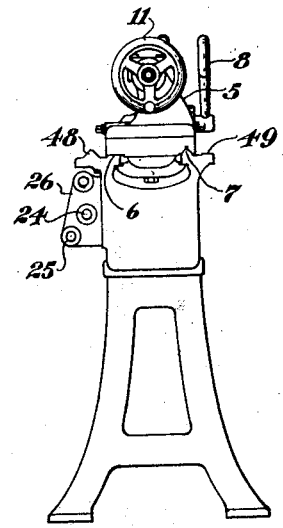
Fig. 3 is a partial right-end view of the machine shown in Fig. 1.

Referring to the accompanying drawings, a machine is illustrated embodying my invention. The principal features of my invention are embodied in a carriage and a slide which control the movements of the tool relatively to a rotating blank. The means for rotating the tool and also the means for supplying power to the carriage may be such means as are embodied in any well known type of lathe. Referring particularly to Figs. 1, 2 and 3, the machine embodies a main frame or bed 1 which supports a headstock 2, a tailstock 3 and a carriage 4. The tailstock 3 comprises a frame 5 which is adapted to move along guideways 6 and 7. A screw member, which is operated by handle 8, is provided for locking the tailstock 3 in any set position along the guideways 6 and 7. A tailstock center pin 9, which is mounted in a spindle 10, is controlled by a hand wheel 11. A lever 12, which operates a suitable screw member, is provided for locking the spindle 10 and the center pin 9 in any adjusted position.

The headstock 2 comprises a frame or body portion 13 which is fixedly connected to the main frame of the machine. If so desired, the frame 13 may be cast as an integral part of the main frame 1. A headstock spindle 14, which is carried by suitable bearings 15 and 16 in the frame 13, is shown provided with a center pin 17. It is to be understood that any suitable collet chuck may be attached to the spindle. Suitable differently diametered pulleys 18 are mounted on the spindle and adapted to be connected to a countershaft. Back gearing 19 is provided which is controlled by a handle 20.

A shaft 21, which carries pulley wheels 22, is suitably mounted in the frame 13 of the headstock. A lever 23, which is mounted on the front face of the headstock frame 13 is provided for operating suitable gearing to connect the shaft 21 to the spindle 14. Inasmuch as my invention does not particularly relate to the specific construction of a headstock, and moreover inasmuch as the headstock features illustrated are old and well known, it is deemed unnecessary to completely illustrate the gearing connection between the spindle and the shaft 21.

The main frame of the machine carries two longitudinally extending shafts 24 and 25 which serve to operate the carriage 4 in a manner to be hereinafter set forth. The shaft 24 serves not only to withdraw the tool from engagement with the blank, in a manner to be hereinafter set forth, but also to effect longitudinal feeding movements of the carriage. The shaft is provided with bearings in brackets 26 and 27 which are attached to the main frame of the machine. The shaft 25, which serves to feed the tool toward the blank at varying rates is provided with a bearing in the bracket 26 and a bearing in lugs 28 which are attached to the side of the main frame of the machine.

A number of differently diametered gear wheels 29 are rotatably mounted on a shaft 30 which projects through a casing 31. The shaft 30 is connected to the shaft 25 by means of any suitable friction clutch 32. The gear wheels 29, which are located in the casing 31, are selectively connected to the shaft 30 by means of a slidable key member 33 which is located in a slot 34 formed in the shaft 30. The position of the key member 33 is varied by means of a handle 35 in order to selectively connect but one of the gear wheels 29 to the shaft 30.

A shaft 36, which is mounted on the frame of the machine adjacent to the shaft 30, carries a number of differently diametered gear wheels 37. The gear wheels 37 mesh with the differently diametered gear wheels 29 which are mounted on the shaft 30. The gear wheels 37 are preferably located within the casing 31. Pulley wheels 38, which are mounted near the end of the shaft 36, are aligned with the pulleys 22 which are mounted on the shaft 21. A belt (not shown) is adapted to extend around an idler pulley 39 to connect the pulleys 22 and 38. The idler pulley 39 is mounted on any suitable stud shaft 40 which extends from the main frame of the machine. Thus, power is supplied from the spindle 14 through the pulleys 22 and 38 to the gear wheels 37 and 29 to the shaft 25. The lever 35 may be operated for varying the rotation of the shaft 25 and, moreover, the position of the belt on the pulleys 22 and 38 may be varied for controlling the rotation of the shaft 25.

A shaft 41, which carries pulley wheels 42 and 43, is provided with a bearing in a bracket 44 and a bearing in the bracket 27. The bracket 44 is attached to the main frame of the machine adjacent to the casing 31. The pulley wheel 42 is adapted to be connected by a belt (not shown) to any suitable countershaft. The pulley wheel 43 is connected by a belt 45 to an oil pump 46 which is mounted on the back part of the frame 1. The shaft 41 is connected by suitable gear wheels 47 to the shaft 24. Thus, the shaft 24, which controls the longitudinal feeding movement of the carriage 4 and the withdrawal of the cutting tool from engagement with the rotating blank, is rotated at substantially constant speed.

The carriage 4 is slidably mounted on guideways 48 and 49 and carries a tool slide 50 which is controlled by a handle 51. A slide 52 is automatically controlled, in a manner to be hereinafter set forth, for cutting the blank to any predetermined contour. The slide 52 may be controlled at will by means of a hand wheel 53. A tool post 54, which carries a cutting tool, is mounted on the tool slide 50.

Referring to Figs. 4 to 15, inclusive, the construction and operation of the carriage 4 will be described in detail. The carriage 4 comprises a base portion 60 which is mounted on the guideways 48 and 49. An apron 61 is attached to the front portion of the carriage. The apron comprises a main frame 62 which is attached to the base 60 of the carriage by suitable screws 63. A back plate 64, as shown in Fig. 6 of the drawings, is attached to the rear of the apron main frame 62 in any suitable manner. Preferably the back plate is attached to the end walls of the main frame by screws 65 and 66. Moreover, a screw 67 is provided for connecting the apron to a lug 68 which projects downwardly from the top wall of the apron main frame 62. Preferably, dowel pins 69 and 70 are provided for adjusting the back apron plate to a set position on the main frame of the apron. A front plate 71, as shown in Figs. 9 and 10 of the drawings, is provided for covering certain openings in the front wall of the main frame of the apron. Straps 72 are attached to the rear of the base member 60 of the carriage by suitable screws. The straps 72 slide in a slot 73 which is formed in the main frame 1 of the machine. Similar straps 74 are attached to the main frame 62 of the apron by the screws 63. The straps 74 engage the lower side of the guide 48, as shown in Fig. 10 of the drawings.

A bracket 75 is slidably mounted on the rear of the main frame 1 for supporting a former member 76. The bracket 75 is held in position on the back of the main frame 1 by means of T-headed bolts 77, one of which is shown in Fig. 7 of the drawings. The T-headed bolts 77 slide within a slot 78 which is formed in the side of the main frame 1, as shown in Fig. 7 of the drawings. Suitable handles 79 are provided for locking the bracket 75 and the bolts 77 in any set position. A former-slide base 80 is mounted on the bracket 75 and is attached thereto by suitable screws 81. Dowel pins 82 may be provided for adjusting the base member 80 to any set position. A slide member 83 is mounted on the base member 80, as shown in Figs. 7 and 8 of the drawings. The slide 83 is adjusted on the base member 80 by means of a screw member 84 which is mounted in a screw bracket 85. The screw bracket is attached to the base member 80 by means of suitable set screws 86. A square head 87 is formed on the end of the screw member 84 whereby such screw may be operated by any suitable wrench. A gib member 88 is operated by screw members 89 to hold the slide 83 in any set position. The screw members 89 are preferably operated by handles 90.

The former member 76 is attached to the slide 83 by means of T-headed bolts 91. The bolts 91 slide in a T-slot 92 which is formed in the former slide 83. The contour of the former member is similar to the contour which is to be cut on the rotating blank. In order to assist in holding the former member 76 in set position and to prevent any possible free movement thereof, a hook bolt 93 is provided. The hook bolt serves to draw the former member back against a suitable shoulder on the slide 83. The position of the former member relative to the frame of the machine may be adjusted either by operating the screw member 84 or by loosening the bolts 77 and shifting the bracket 75 along the main frame of the machine.

A former pin 95 resiliently engages the former member 76. The former pin is made a trifle larger in diameter than the cutting tool in order to prevent cutting steep portions of the blank contour to the dimensions of the finished cutter. The pin 95 is attached to a sliding plate 96 by means of a bolt 97. The plate 96 slides within a slot formed in the slide 52 and is provided with shoulder portions which are engaged by clamping plates 98. The clamping plates 98 are secured to the top of the slide by means of suitable screws. A rod 99 is threadedly connected to the end of the plate 96 and extends through an orifice in the slide 52. The orifice extends between a recess 100 and a second recess 101. A collar member 102, which is pinned to the rod 90, is located near the end of the rod 99 in the recess 101. Such collar member 102 limits the forward movement of the rod 99 and the former pin 95. A spring member 103 is mounted on the rod 99 between the sliding plate 96 and one side of the recess 100. Such spring member 103 resiliently forces the former pin 95 to its forward position in order to resiliently engage the former member 76.

A worm member 104 is slidably mounted on but is keyed to the shaft 25 which controls the transverse feeding movement of the cutting tool. The worm member 104 is mounted on the shaft 25 between two walls 105 of the main frame 62 of the apron. The worm member 104 meshes with a worm wheel 106 which is fixedly mounted in any suitable manner upon a clutch shaft 107. The shaft 107 has a bearing 108 in the front face of the main frame 62 of the apron and a second bearing 109 in the back apron plate 64. The shaft 107 also carries a gear wheel 110, a spiral gear wheel 111, a clutch member 112 and collar member 113. The collar member 113 is pinned to the shaft 107 outside the front wall of the apron frame 62 and the gear wheel 110 is pinned to the shaft adjacent to the inside surface of the front wall of the apron frame 62. By so mounting the collar member and the gear wheel 110 to the shaft 107, longitudinal movement of said shaft in the apron is prevented. The gear wheel 110 is connected, in a manner to be hereinafter set forth, to control the transverse feeding and withdrawing movements of the slide 52. The spiral gear wheel 111 is rotatably mounted on the shaft 107 and is held in position on such shaft between the gear wheel 110 and a shoulder 114 which is formed on the shaft. Clutch teeth 115 are formed on one side of the spiral gear wheel 111. The clutch teeth 115 are adapted to mesh with similar clutch teeth 116 on the clutch member 112 under certain conditions. The worm wheel 106 is rotatably mounted on the shaft 107 and is held in position on such shaft between a collar member 117 and a shoulder 118 which is formed on the shaft. The worm wheel 106 is provided with clutch teeth 119 adjacent to clutch teeth 120 which are formed on the clutch member 112.

The clutch member 112 is keyed to but is slidably mounted on the shaft 107. An annular groove 121 is formed in the clutch member 112. A yoke member 122, which is operated in a manner to be hereinafter set forth, is provided with shoes 123 which project into the groove 121. The clutch member 112 is operated by the yoke member 122 for meshing the clutch teeth 115 and 116 to connect the spiral gear 111 to the shaft 107, or for meshing the clutch teeth 119 and 120 to connect the worm wheel 106 to the shaft 107. When the spiral gear 111 is connected to the shaft 107, the cutting tool is withdrawn from engagement with the rotating blank and when the worm wheel 106 is connected to the shaft 107, the cutting tool is fed transversely into engagement with the rotating blank.

Figure 4:
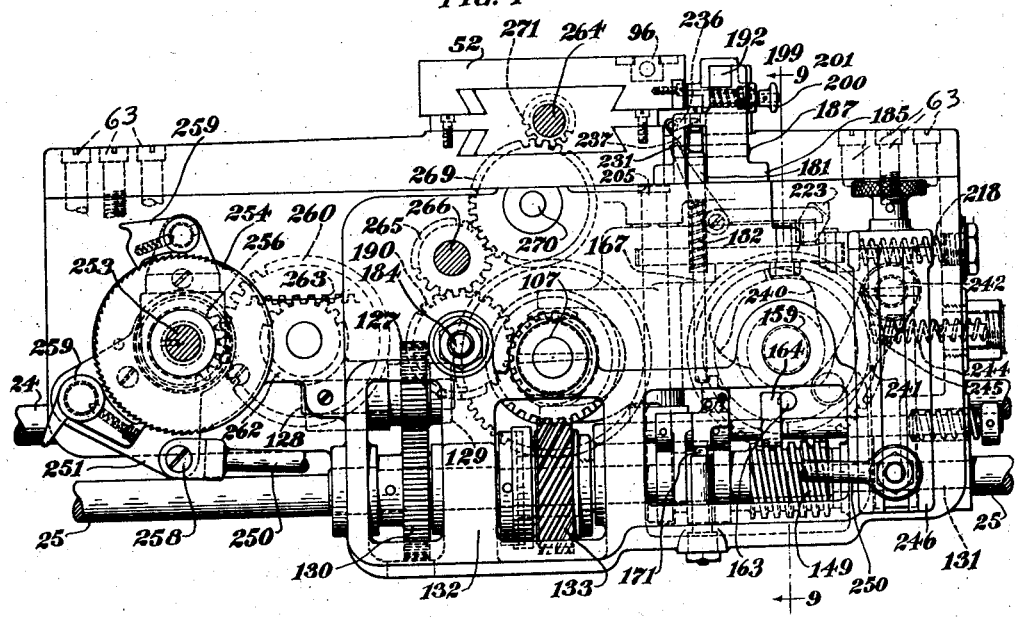
Fig. 4 is a front elevational view partially in section of the mechanism for automatically reciprocating the slide.
Figure 5:
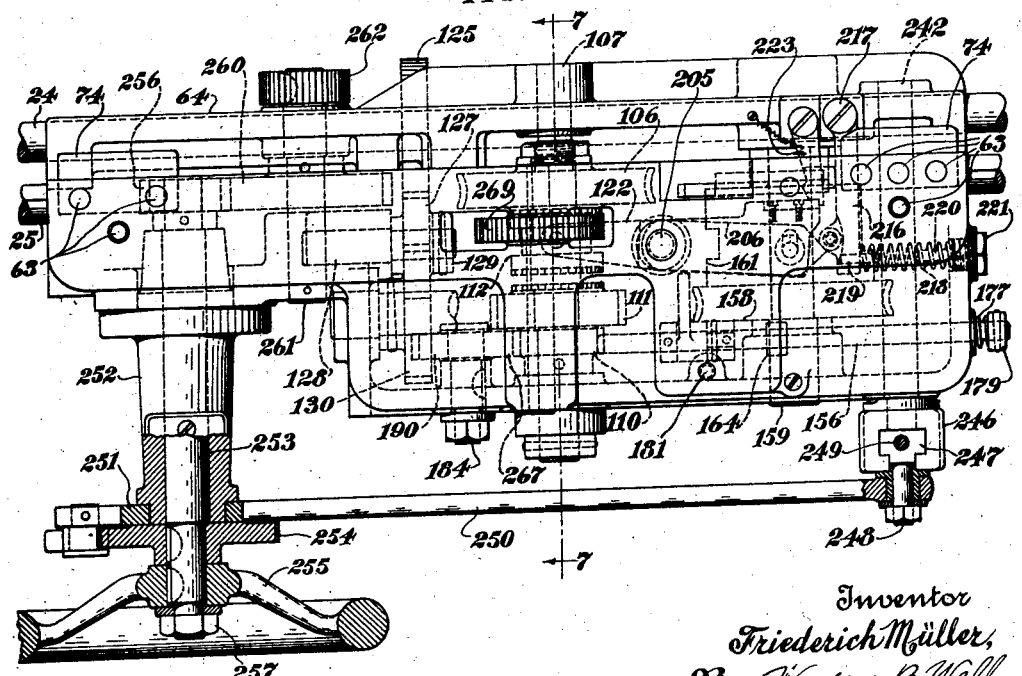
Fig. 5 is a plan view of the mechanism shown in Fig. 4.

A gear wheel 125 is keyed to and is slidably mounted on the shaft 24. The gear wheel 125 is mounted on the shaft 24 between the sides of a bracket 126 which is attached to the back apron plate 64, as shown in Fig. 6 of the drawings. By so mounting the gear wheel 125 on the shaft 24, it is compelled to follow the movements of the carriage 4 in the same manner as the worm wheel 104 on the shaft 25 is compelled to follow the movements of the carriage. The gear wheel 125 meshes with a gear wheel 127 which is mounted on a shaft 128. The shaft 128, is fixedly mounted in the main frame 62 of the apron, as shown in Figs. 4 and 5 of the drawings. The gear wheel 127 is rotatably mounted on the shaft 128 and is held in position on such shaft by means of a collar member 129 which is pinned to the shaft 128. The gear wheel 127 meshes with a gear wheel 130 which is mounted on a shaft 131. The shaft 131 is provided with bearings in the end walls of the main frame 62 of the apron. The gear wheel 130 is pinned to the shaft 131 in any suitable manner and is located between one end wall of the apron frame and a wall 132 which is located within the apron. A spiral gear wheel 133 is frictionally connected to the shaft 131 adjacent the wall 132 and meshes with the spiral gear wheel 111 which is mounted on the shaft 107. Thus, it is apparent power from the shaft 24 is transmitted through the gear wheels 125, 127, 130, 133, and 111 to the shaft 107.

Referring to Fig. 14 of the drawings, the preferred frictional connection of the spiral gear wheel 133 to the shaft 131 is illustrated. A sleeve member 135 having a collar portion 136 formed integrally therewith is keyed or pinned to the shaft 131. An annular ring 137 of resistance material, such as leather, is mounted on the sleeve 135 adjacent to the collar portion 136. The leather ring 137 is held in position against the collar member 136 by a cup-shaped member 138 which projects over the edge of the collar portion 136. The gear wheel 133 is mounted on the sleeve 135 between the cup-shaped member 138 and a collar 139. A nut 140, which is threadably connected to the sleeve 135, holds the collar in position. The gear wheel 133 is provided with recesses 141 within which pins 142, which are secured to the cup-shaped member 138, project. The pins 142 are provided with shoulder portions which engage the face of the cup-shaped member 138. Spring members 144 are provided in certain recesses 145 in the spiral gear wheel 133 for forcing the cup member 138 toward and the leather ring 137 into engagement with the collar portion 136 of the sleeve member. A frictional connection is thus established between the spiral gear wheel 133 and the shaft 131. The frictional connection between the spiral gear wheel 133 and the shaft 131 is provided in order to permit the sudden stopping of the slide 52 during the withdrawing movement of the cutting tool.

A worm member 149 is rotatably mounted on the shaft 131, as shown in Fig. 13 of the drawing. The worm member is held against longitudinal movement along the shaft 131 by a shoulder 150 on the shaft and a collar member 151 which engages the bearing for the shaft in the frame 62. A clutch member 152 is mounted on the shaft 131 adjacent to the worm member 149. Such clutch member 152 is keyed to and slidably mounted on the shaft. Clutch teeth 153 are provided on the side of the clutch member for engaging similar clutch teeth 154 which are formed on the end of the worm member 149. A yoke member 155, which is mounted on a cam rod 156, is fitted to an annular groove 157 formed on the clutch member 152.

The worm member 149 meshes with a worm wheel 158 which is rotatably mounted on a stationary shaft 159, as shown in Figs. 4 and 9 of the drawings. The shaft 159 is secured in the front wall of the main apron frame 62 by means of a set screw 160. The shaft 159 is also supported by the back apron plate 64, as shown in Fig. 9 of the drawings. The worm wheel 158 is secured to a cam member 161 by means of screws 162. A pin 163, which projects from the face of the worm wheel 158, is adapted to engage a stop member 164 under certain conditions. The stop member 164 is fixedly mounted on the cam rod 156. The rod 156 is given a movement of rotation by the withdrawal movement of the slide 52, in a manner to be hereinafter set forth, to withdraw the stop member 164 from the path of movement of the pin 163 and to permit the rotation of the worm wheel 158 and the cam member 161. The cam member 161, during its rotation, serves to stop the withdrawal movement of the slide 52 and the cutting tool and to initiate a transverse feeding movement of such slide and cutting tool.

The cam rod 156 is given a movement of rotation by means of a rod 167 which is moved downwardly near the end of the withdrawal movement of the slide, in a manner to be hereinafter set forth. The rod 167 engages a lever 168 which is pivotally mounted on a block 169. The block 169 is fixedly mounted in any suitable manner on the rod 156. A spring member 170 is provided for holding the lever 168 in the position shown in Fig. 13 in order to be engaged by the rod 167. A plunger 171 is mounted in a cylinder 172 which projects from the bottom wall of the main apron frame 62. A spring member 173, which is mounted on the plunger 171 between the head thereof and the bottom of the cylinder 172, serves to resiliently hold the plunger in engagement with the block 169, as shown in Figs. 4, 9 and 13 of the drawings. The spring member 173 and the plunger 171 operating on the block 169 normally hold the rod 156 in such rotative position that the stop member 164 is in position to be engaged by the pin 163, as shown in Fig. 9 of the drawings. Upon movement of the rod 167 downwardly, the cam rod 156, as shown in Fig. 9 of the drawings, is given a movement of rotation in a counter-clockwise direction to remove the stop member 164 from the path of movement of the pin 163.

The rod 156, which carries the stop member 164, the yoke member 155 and the block 169, is supported near one end in an end wall of the apron frame 62 and is supported near the other end in an interior wall of the apron frame 62, as shown in Fig. 13 of the drawings. A spring member 177, which extends into a recess 178 formed in the end wall of the main apron frame 62, is mounted on the shaft 156. The spring member 177 engages a collar member 179, which is pinned to the shaft 156, and exerts a force tending to move the rod 156 towards the right, as shown in Fig. 13 of the drawings. Thus, the rod 156 normally tends to so move the yoke member 155 as to mesh the clutch teeth 153 with the clutch teeth 154. Upon meshing of such clutch teeth, the worm member 149 is connected to the shaft 131. Although the yoke member 155 is rotatably mounted on the rod 156, it is compelled to move longitudinally with the rod 156 by means of a collar member 180, which is pinned to the rod 156 on one side of the yoke member 155, and the block member 169, which is pinned to the rod 156 on the other side of the yoke member. As heretofore set forth, the spring member 173 and the plunger 171 operate the block member 169 to force the stop member 164 into the path of movement of the pin 163. When the worm wheel 158 and the cam member 161 have completed one rotation, the pin 163 engages the stop member 164 and moves the rod 156 longitudinally towards the left in order to disengage the clutch member 152 from the worm member 149. In case the rod 156 is moved longitudinally by the pin 163 engaging the stop member 164 before the rod 167 has been raised, in a manner to be hereinafter set forth, the lever 168 is rotated on the block 169 against the tension of the spring 170. Upon raising of the rod 167, the lever 168 assumes the position relative to the rod 167, as shown in Fig. 13 of the drawings.

The rod 167 is provided with a head portion 181 which projects through the top of the apron frame 62. A spring member 182, which is located in a recess 183 formed in the apron frame 62, engages the head portion 181 of the rod 167 to normally exert a force tending to move the rod upwardly.

A bracket 185 is mounted on the top of the apron frame 62 above the rod 167, as shown in Figs. 4, 7 and 8 of the drawings. A bell-crank lever 186, which is located in a slot 188 formed in the bracket 185, is pivotally mounted on a pin 187. The movement of one arm of the bell-crank lever 186, which engages the head 181 of the rod 167, is limited by a set screw 189. The other arm of the bell-crank lever 186 is adapted to be engaged by an adjustable block 191 when the slide 52 is near the end of the withdrawal movement.

The block 191 is slidably mounted on a bar 192. The bar 192 is secured to the bracket 185 by means of set screws 193. The bracket 185 is preferably secured to the apron frame 62 by means of set screws 194. A second bracket 195 is secured to the base 60 of the carriage for supporting the bar 192. The bar 192 is secured to the bracket 195 by screws 196. The block member 191, which is slidably mounted on the bar 192, is adapted to engage a plate 197 in order to be moved in accordance with the movement of the slide 52. The plate 197 is secured to the slide 52 by screws and is provided with teeth 198 to be engaged by similar teeth formed on a movable plunger 199 which is carried by the block 191. The plunger 199 is controlled by a handle 200 and extends through an orifice formed in the block 191. A spring member 201, which is mounted on the plunger 199 and located within the orifice, serves to exert a force tending to move the plunger into engagement with the plate 197. A set screw 202 is provided for holding the plunger 199 in any set position. A collar member 203, which is fastened to the bar 192 by means of a screw 204, serves to control the movement of the block 191 along the bar 192. While progressively cutting smaller diameters on the blank, the collar member may be used for changing the position of the block to vary the withdrawing movements.

When the slide 52 is near the end of the withdrawing movement, the block 191 engages the bell-crank lever 186 which in turn forces the rod 167 downwardly. The movement of the rod 167 gives the cam rod 156 a movement of rotation in a counterclockwise direction. Such movement of the rod 156 removes the stop member 164 from the path of movement of the pin 163 to permit the free rotation of the worm wheel 158 and the cam member 161. Moreover, the spring member 177 moves the rod 156 towards the right, as shown in Fig. 13 of the drawings when the stop member 164 is disengaged from the pin 163. Such movement of the cam rod operates the clutch member 152 to connect the worm member 149 to the shaft 131. The worm member 149 rotates the worm wheel 158 through a complete rotation. When the worm wheel 158 has completed a rotation, the pin 163 engages the stop member 164 and so moves the cam rod 156 as to compel the yoke member 155 to disengage the clutch member 152 from the worm member 149.

The yoke member 122, which controls the clutch member 112, is rotatably mounted on a shaft 205. The shaft 205 extends downwardly through the main frame 62 of the apron and is supported in the top and bottom walls of the main frame, as shown in Fig. 9 of the drawings. The yoke member 122 carries a lever 206 which is mounted on the shaft 205. The lever 206 is located in a slot 207 formed in the yoke member. The lever carries a pin 208 which projects into an arcate slot 209 formed in an arm 210 of the yoke member. A roller 211, which is mounted on the pin 208, is adapted to operate in cam grooves 212 which are formed on the periphery of the cam member 161. Thus, the rotative movement of the worm wheel 158 and the cam member 161 serves to effect a movement of rotation of the lever 206 on the shaft 205 in accordance with the form of the cam groove 212. The lever 206 is provided with a wedge-shaped end portion 214 which is engaged by a roller 215. The roller 215 is rotatably mounted on a lever 216. The lever 216 is pivotally mounted on the back cover 64 of the apron by means of a suitable bolt 217. A spring member 218 is disposed between the end wall of the main apron frame 62 and the lever 216 for resiliently holding the roller member 215 in engagement with the end portion 214 of the lever 206. The spring member 218 is held in position by a pin 219 which projects from the lever 216 and a pin 220 which is preferably threadably connected to the end wall of the main apron frame 62. The pin 220 is controlled and secured to the end wall by means of an enlarged head 221. The roller member 215 acting on the wedge-shaped end portion 214 of the lever 206 serves to hold the pin 208 in one or the other of its extreme positions in the arcate slot 209.

A wearing plate 222 is secured to the end of the arm 210 of the yoke member by screws as shown in Fig. 11 of the drawings. The arm 210 of the yoke member is controlled by a trip mechanism which is operated in accordance with the transverse feeding movement of the slide 52. The trip mechanism comprises a lever 223 which is mounted adjacent to the lever 216 on the back plate 64 of the apron. A shoulder portion 224 is formed on the end of the lever 223 for engaging the wearing plate 222. The lever 223 is forced towards the left, as shown in Fig. 11, by means of a spring member 225 for engaging the top of the wearing plate 222. A bell-crank lever 226 is provided with a latch portion 227 on one arm thereof which engages the end of the lever 223 to hold the shoulder 224 in engagement with the wearing plate 222, as shown in Figs. 4 and 5 of the drawings. When the yoke member 122 is held in the position shown in Figs. 4 and 5 of the drawings, the clutch member 112 is in position for effecting a transverse feeding movement of the slide 52. The arm of the bell-crank lever 226, which carries the latch portion 227, is provided with a cam portion 228 which engages a cam surface 229 on a lug 230 projecting from the lever 223, as most clearly shown in Figs. 11 and 12 of the drawings. The other arm 231 of the bell-crank lever 226 is operated near the end of the transverse feeding movement, in a manner to be hereinafter set forth, to effect a movement of rotation in a counterclockwise direction, as shown in Fig. 12 of the drawings. Such movement of the bell-crank lever 226 releases the latch 227 from the lever 223 and the cam surface 228 operating on the cam surface 229 assists in forcing the shoulder portion 224 of the lever 223 away from the wearing plate 222. The roller 215, which at this time engages the lower side of the wedge end portion 214 of the lever 206, forces the yoke member 122 and the lever 206 upwardly, as shown in Fig. 11 of the drawings. When the yoke member is so moved, the clutch member 112 is moved away from the feeding position.

The rod 99, shown in Figs. 7 and 8 of the drawings, which is connected to the former pin 95, engages a lever 232. The lever 232 is mounted on a rod 233 which is located within the recess 101 formed in the slide 52. The rod 233 is rotatably mounted in a block 234 which is secured to the slide 52 by screws. A second arm 235 is fixedly connected to the rod 233 at any suitable angle with respect to the lever 232. The lever 235 is adapted to engage an elongated arm of a bell-crank lever 236, as shown in Figs. 4, 7 and 8 of the drawings. The other arm 237 of the bell-crank lever is adapted to engage the arm 231 of the bell-crank lever 226.

When a transverse feeding movement of the slide 52 is to be effected, the clutch member 112 is moved to connect the worm wheel 106 to the shaft 107. The trip mechanism, comprising the lever 223 and the bell-crank lever 226, is in engagement with the yoke member 122. Moreover, the roller 215 on the lever 216 is in engagement with the lower side of the wedge-shaped end portion 214 of the lever 206. Thus, upon release of the yoke member 122 when the trip mechanism is operated by the levers controlled by the former pin, the clutch member 112 is swung out of engagement with the clutch teeth on the worm wheel 106 and into engagement with the clutch teeth on the spiral gear wheel 111. Accordingly, the feeding movement of the slide is stopped and a withdrawal movement is started. The yoke member 122 is operated to disconnect the clutch member 112 from the spiral gear wheel 111 and to connect it with the worm wheel 106 at the end of the withdrawing movement. Such movement of the yoke member is effected by the action of the cam member 161 on the roller 211. The cam member 161 acting on the roller 211 forces the lever 206 and the yoke member to the position shown in Fig. 5 and finally to a position with the roller member 215 acting on the lower side of the wedge end portion 214 of the lever 206. The yoke member is left in such position during the transverse feeding movement of the slide 52 in order to quickly stop such movement upon operation of the trip mechanism. The cam member 161 operates the yoke member 122 and the lever 206 to the position shown in Fig. 5 of the drawings to effect a feeding movement and in order to permit the resetting of the trip mechanism.

A cam disk 240 is mounted on the end of the cam member 161, as shown in Fig. 9 of the drawings. The cam disk 240 engages a lever 241 for effecting a longitudinal feeding movement of the carriage at the end of each transverse withdrawing movement. The lever 241 is pinned to a shaft 242. The shaft 242 has a bearing in the front wall of the main apron frame 62 and a second bearing in the back apron plate 64. The lever 241 carries a roller member 243, which is resiliently held in engagement with the cam disk 240. The roller 243 is resiliently held in engagement with the cam disk by means of a spring member 244 which acts on a short lever 245. The lever 245 is pinned to the shaft 242. The spring member 244 is held in position between the lever 245 and an end wall of the main apron frame 62 by means of a pin which projects from the lever 245 and a pin which is threadably connected to the end wall of the apron. The latter pin is provided with a hexagonal head, as shown in Fig. 4 of the drawings. By so connecting the spring member 244, it may be removed through the end wall to permit replacement or repair.

A slotted lever 246 is fixedly mounted on the end of the shaft 242. A block member 247 having a wrist pin 248 connected to it is fitted to the T-slot formed in the lever 246. A screw member 249, which is operated by a thumb member, is mounted in the upper end of the lever 246 and serves to adjust the position of the block 247 in the T-shaped slot. The wrist pin 248, which projects from the block 247, is connected by a lever 250 to a crank disk 251. The crank disk 251 is rotatably mounted on a hub member 252 which is secured to the front face of the main apron frame 62. A shaft 253 projects through the hub member 252. A ratchet wheel 254 and a hand wheel 255 are keyed to the shaft 253 and are located adjacent to the crank disk 251. A gear wheel 256 is pinned to the shaft 253 adjacent to the inside end of the hub member 252. The ratchet wheel 254 abuts a shoulder portion on the shaft 253 and is held against such shoulder by a nut 257. The nut 257 is secured to the end of the shaft adjacent to the hand wheel 255. The nut 257 and the gear wheel 256 prevent any longitudinal movement of the shaft 253 in the hub member 252. The lever 250 is pivotally connected to the crank disk 251 by means of a pin 258 which projects from the face of the disk. The crank disk 251 carries two suitable dog members 259 which are adapted to engage the teeth of the ratchet wheel 254 and to effect movement thereof in accordance with the movement of the crank disk. Such mechanism is well known and a further description thereof is deemed unnecessary.

The gear wheel 256, which is mounted on the end of the shaft 253, meshes with a gear wheel 260. The gear wheel 260, as shown in Fig. 5 of the drawings, is pinned to a shaft 261. The shaft 261 is provided with a bearing in the front wall of the apron frame 62 and a second bearing in the back apron plate 64. A gear wheel 262 is keyed to the shaft 261 outside the back apron plate 64. The gear wheels 262 and 260, being keyed to the shaft 261 on opposite sides of the apron plate 64, prevent any longitudinal movement of the shaft. The gear wheel 262 meshes with a rack member 263 which is mounted on the main frame of the machine.

From the above description, it is apparent the rotation of the shaft 159 and the cam member 161 operates the cam disk 240 for effecting an oscillatory movement of the levers 241 and 246 which are mounted on the shaft 242. The lever 246 operates the crank disk 251 and the ratchet wheel 254 by means of the lever 250. The operation of the ratchet wheel 254 gives a movement of rotation to the gear wheels 256, 260 and 262. The gear wheel 262, operating on the rack member 263, effects a longitudinal feeding movement of the carriage.

The gear wheel 110, which is mounted on the shaft 107, connects either the spiral gear wheel 111 or the worm wheel 106 to a screw shaft 264 for effecting either a withdrawal movement or a feeding movement of the slide 52. A member 265, which is pinned to a shaft 266, is provided with gear teeth 267 which mesh with the teeth on a gear wheel 190. The gear wheel 190 is rotatably mounted on a shaft 184 which is supported in the main apron frame 62. The gear wheel 190 meshes with the gear wheel 110. The member 265 is further provided with elongated gear teeth 268 which mesh with the teeth on a gear wheel 269. The shaft 266 is provided with a bearing in the front wall of the main apron frame 62 and a second bearing in the back apron plate 64. Such shaft 266 has a longitudinal movement which is limited by the member 265 and an operating handle 270. By shifting the shaft 266, the gear teeth 267 can be thrown out of mesh with the gear teeth on the gear wheel 190. The gear teeth 268 are always maintained in mesh with the gear teeth on the gear wheel 269. By such means, the movement of the slide 52 can be stopped at any time. The gear wheel 269 is mounted on a shaft 270 which has bearings in the top face of the main apron frame 62. The teeth on the gear wheel 269 mesh with elongated teeth 271 which are formed on the screw shaft 264 for operating the slide 52. The screw shaft 264 may be also operated by the hand wheel 53.

Assuming a blank to be continuously rotating in the machine and the cutting tool and the slide to be effecting a transverse feeding movement, such movement is continued until the former pin 95 engages the former member 76. Upon engagement between such members, the rod 99, which is connected to the former pin, is shoved backwardly against the lever 232 to rock the shaft 233. Upon rocking the shaft 233, the lever 235 operates upon the elongated arm of the bell-crank lever 236, the other arm 237 of the bell-crank lever operates the bell-crank lever 226 to release the trip mechanism. During the feeding movement the clutch member 112 is in engagement with the worm wheel 106, the trip mechanism holding the yoke member 122 and the lever 206 against the roller 215 which is mounted on the lever 216. Upon operation of the bell-crank lever 226, the latched end portion 227 of such bell-crank lever releases the lever 223. The angle of the shoulder portion 224 is so positioned relative to the wearing plate that the spring member 218 acting on the bar 216 exerts a force tending to force the shoulder portion away from the wearing plate. Moreover, the cam surface 228 on the end of one arm of the bell-crank lever and the cam surface 229 on the lever 223 assist in moving the shoulder 224 on the lever 223 away from the wearing plate 222 on the yoke member. Accordingly, the yoke member is given a movement of rotation in a counter-clockwise direction, as shown in Fig. 11 of the drawings. The clutch member 112 is withdrawn from engagement with the worm wheel 106, which effects the transverse feeding movement, and is moved into engagement with the spiral gear wheel 111 to effect a withdrawing movement.

It has been heretofore set forth that the transverse feeding movement of the slide 52 and the cutting tool is effected from the shaft 25 through the worm member 104, worm wheel 106, clutch member 112, gear wheels 110 and 190, gear member 265 and the gear wheel 269 to the screw shaft 264. In a similar manner, the withdrawal movement of the slide 52 and the cutting tool is effected from the shaft 24 through the gear wheels 125, 127, spiral gear wheels 133 and 111, clutch member 112, gear wheels 110 and 190, gear member 265 and the gear wheel 269 to the screw shaft 264.

The withdrawing movement of the slide and the cutting tool is continued until the block member 191 engages the bell-crank lever 186. The bell-crank lever 186 pushes the head of the rod 167 downwardly. The rod 167 engaging the lever 168 on the block member 169, effects a movement of rotation of the cam rod 156. Such movement of the cam rod withdraws the stop member 164 from the path of movement of the pin 163 on the worm wheel 158. Moreover, the spring member 177 shifts the rod 156, the yoke member 155 and the clutch member 152 longitudinally to connect the worm member 149 to the shaft 131. The shaft 131 is geared to and rotated by the shaft 24 as heretofore set forth. Thereupon, the worm wheel 158 and the cam member 161 effect a movement of rotation. The cam member 161 operating on the roller 211, which is attached to the lever 206, first moves the yoke member 122 and the lever 206 to the extreme transverse feeding position shown in Fig. 5 in order to permit the resetting of the trip mechanism. Finally, the lever 206 is moved by the cam member to a position wherein the roller 215 on the lever 216 engages the lower side of the wedge-shaped end portion 214 of the lever 206. The rotation of the worm wheel 158 and the cam member 161 also operates the cam disk 240. The cam disk 240 operates the lever 241 which is mounted on the shaft 248. Rotative movement of the shaft 248 effects a longitudinal feeding movement of the carriage in the manner heretofore set forth. Such longitudinal feeding movement of the carriage may be timed to take place in any timed relation relative to the stopping of the withdrawal movement and the starting of the transverse feeding movement of the slide 52. The transverse feeding movement is continued until the former pin 95 again engages the former member 76 to again repeat the before described cycle of operations.

Referring to Fig. 15 a modification is illustrated for mounting the former pin on the slide. Two roller members 280 are mounted on brackets which are attached to the main base 60 of the carriage. The plate 96, which carries the former pin 95, is provided with an extended portion 281 which operates between the roller members 280. Preferably, the extending portion 281 is provided with an opening 282 for permitting access to the former pin 95. By such construction the former pin is more firmly held in position.

Modifications in the machine and in the arrangement and location of parts may be made within the spirit and scope of my invention and such modifications are intended to be covered by the appended claims.

What I claim is:

1. In a machine for turning metal blanks, the combination comprising means for continuously rotating a blank, a cutting tool, a former member having a non-rectilinear contour consisting in part of a relatively steep portion and similar to the contour which is to be cut on the blank, means automatically controlled by the former member for moving the tool into and out of engagement with the blank, and means for effecting intermittent longitudinal feeding movements only when the tool is out of engagement with the blank to cut the blank in accordance with the contour of the former member.

2. In a machine for turning metal blanks, the combination comprising means for continuously rotating a blank, a cutting tool, a former member having a contour which is similar to the contour to be cut on the blank, means automatically controlled by the former member for reciprocating the tool irrespective of the rotative position of the blank and means for effecting intermittent longitudinal feeding movements to cut the blank in accordance with the contour of the former member, said longitudinal feeding movements being effected only when the tool is out of engagement with the blank.

3. In a machine for turning metal blanks, the combination comprising means for continuously rotating a blank, a cutting tool, a former member having a contour which is similar to the contour to be cut on the blank, means automatically controlled by the former member for reciprocating the tool, and means for effecting a longitudinal feeding movement only between reciprocations and when the tool is out of engagement with the blank to cut the blank in accordance with the contour of the former member.

4. In a machine for turning metal blanks, the combination comprising means for continuously rotating a blank at any desired speed, a cutting tool, a former member having a non-rectilinear contour which is similar to the contour to be cut on the blank, means operated by the blank-rotating means and automatically controlled by the former member for reciprocating the tool irrespective of the rotative position of the blank, and means for effecting a longitudinal feeding movement of the tool only when out of engagement with the blank to cut the blank in accordance with the contour of the former member.

5. In a machine for turning metal blanks, the combination comprising means for continuously rotating a blank at any desired speed, a cutting tool, a former member having a non-rectilinear contour which is similar to the contour to be cut on the blank, means operated by the blank-rotating means and automatically controlled by the former member for transversely feeding the tool different depths, and means for effecting longitudinal feeding movement of the tool only between the transverse feeding movements when the tool is out of engagement with the blank.

6. In a machine for turning metal blanks, the combination comprising means for continuously rotating a blank, a cutting tool, means for variably reciprocating said cutting tool in accordance with a predetermined contour, and means for effecting a feeding movement of the tool along the blank only between reciprocations when the tool is out of engagement with the blank to cut the blank to the predetermined contour.

7. In a machine for turning blanks, the combination with means for continuously rotating a blank, and a cutting tool movable transversely and longitudinally with respect to the blank, of a former member, automatic means for effecting transverse feeding and withdrawing movements of the tool, and means for effecting an intermittent longitudinal feeding movement after each withdrawing movement, the depth of the transverse feeding movements being limited by said former member to cut the blank to any desired contour.

8. In a machine for turning blanks, the combination with means for continuously rotating a blank, a cutting tool movable transversely and longitudinally with respect to the blank, means for effecting a transverse feeding movement of the tool, and means comprising a former member for limiting the transverse feeding movement of the tool and for automatically withdrawing the tool from engagement with the blank, of automatic means for stopping the withdrawing movement of the tool and for starting a transverse feeding movement of the tool, and means for automatically effecting a feeding movement of the tool longitudinally of the blank between the withdrawing and the transverse feeding movement of the tool.

9. In a machine for turning blanks, the combination with means for supporting and for rotating a blank, and a cutting tool for engaging the blank, of means for feeding the cutting tool radially with respect to the blank, means comprising a former member for limiting the radial feeding movement of the tool, means for automatically withdrawing the tool from engagement with the blank, and means for automatically effecting a longitudinal feeding movement of the tool when out of engagement with the blank.

10. In a machine for turning blanks, the combination with means for rotating a blank, a cutting tool movable transversely and longitudinally with respect to the blank, and a former member having a contour similar to the contour to be cut on the blank, of means controlled by the former member for transversely feeding the cutting tool, means for automatically withdrawing the cutting tool a predetermined distance from the blank, for effecting a longitudinal feeding movement of the tool, and for initiating another transverse feeding movement of the tool.

11. In a machine for turning blanks, the combination with means for rotating a blank, and a cutting tool movable transversely and longitudinally with respect to the blank, of automatic means for variably moving the tool into and out of engagement with the blank to cut the blank to different diameters and means for effecting longitudinal feeding movements of the tool with respect to the blank only when the tool is out of engagement with the blank and is effecting no transverse movement.

12. In a machine for turning blanks, the combination with means for continuously rotating a blank, a cutting tool movable transversely and longitudinally with respect to the blank, and a former member, of automatic means governed by said former member for moving the tool into and out of engagement with the blank to cut it to different diameters and means for effecting a longitudinal feeding movement of the tool with respect to the blank at the end of each withdrawing movement when the tool is out of engagement with the blank.

13. In a machine for turning blanks, the combination with means for continuously rotating a blank, and means operated by the blank-rotating means for reciprocating the tool with respect to said blank, of a former member having a contour similar to the contour to which the blank is to be cut, means controlled by the former member for automatically varying the reciprocating movements of the tool to cut the blank to different diameters, and automatic means for effecting intermittent longitudinal feeding movements of the tool only between the reciprocating movements.

14. In a machine for turning blanks, the combination with means for rotating a blank, a cutting tool movable transversely and longitudinally with respect to the blank, and a former member having a contour similar to the contour to be cut on the blank, of automatic means operated by the blank-rotating means and controlled by said former member for reciprocating the tool transversely through varying distances, and means for effecting feeding movements only between the reciprocating movements when the tool is effecting no transverse movement to cut the blank to a contour similar to the contour of the former member.

15. In a machine for turning blanks, the combination with a continuously rotating blank, a carriage movable longitudinally with respect to the blank, a slide mounted on said carriage and adapted to move transversely with respect to the blank, a cutting tool mounted on said slide, and a former member having a contour similar to the contour to be cut on the blank, of means for reciprocating said slide, means controlled by the former member for automatically varying said reciprocating movement, and automatic means for effecting intermittent feeding movements of the carriage only between the reciprocating movements of the slide.

16. In a machine for turning blanks, the combination with a rotating blank, a carriage movable longitudinally of said blank, a slide mounted on said carriage and adapted to move transversely with respect to the blank, a former member having a contour similar to the contour to be cut on the blank, means operated by the blank rotating means for reciprocating said slide, and a cutting tool mounted on the slide, of automatic means controlled by said former member for varying the reciprocating movements of the slide and means for effecting intermittent feeding movements of the carriage only between the reciprocating movements of the slide.

17. In a machine for turning blanks, the combination with means for rotating a blank, a carriage movable longitudinally with respect to the blank, a slide mounted on the carriage and adapted to move transversely with respect to the blank, a cutting tool mounted on the slide, and a shaft mounted on the carriage for feeding and withdrawing the slide with respect to the blank, of a set of gearing for operating the slide shaft to effect a cutting stroke by the tool, a second set of gearing for operating the slide shaft to withdraw the slide, a clutch mechanism for selectively connecting said sets of gearing between the blank rotating means and the slide shaft, and means controlled by said slide for operating said clutch mechanism.

18. In a machine for turning blanks, the combination with means for rotating a blank, a carriage movable longitudinally with respect to the blank, a slide mounted on the carriage and adapted to move transversely with respect to the blank, a cutting tool mounted on the slide, a shaft mounted on said carriage for feeding and for withdrawing the slide with respect to the blank, and a former member mounted on the machine and having a contour similar to the contour to be cut on the blank, of means controlled by said former member for operating the slide shaft to feed the slide and tool varying depths and means for only effecting feeding movements of carriage between feeding movements of the slide.

19. In a machine for turning blanks, the combination with means for rotating a blank, a longitudinally movable carriage, a transversely movable slide mounted on said carriage, a cutting tool mounted on said slide, a shaft mounted on the carriage for effecting reciprocating movements of the slide, and a former member mounted on the machine and having a contour similar to the contour to be cut on the blank, of automatic means controlled by said former for operating said slide shaft to reciprocate the slide and said tool variably and means for only effecting feeding movement of said carriage when the tool is out of engagement with the blank.

20. In a machine for turning blanks, the combination with means for rotating a blank, a longitudinally movable carriage, a transversely movable slide mounted on said carriage, a cutting tool mounted on said slide, a shaft mounted on said carriage for moving the slide, two sets of gearing, and a clutch mechanism for selectively connecting one of said sets of gearing to the slide shaft, one of said sets of gearing serving to operate the slide shaft to effect a feeding movement by the slide and the other set of gearing serving to operate the slide shaft to withdraw the slide and the tool from the blank, of a former member having a contour similar to the contour to be cut on the blank, means comprising a former pin mounted on the slide for engaging the former member to stop the feeding movement of the slide and to effect a withdrawing movement, means operative upon a predetermined withdrawal of the slide for stopping the withdrawing movement for effecting a feeding movement of the carriage and for effecting a transverse feeding movement of the slide.

21. In a machine for turning blanks, the combination with means for rotating a blank, a longitudinally movable carriage, a transversely movable slide mounted on said carriage, a cutting tool mounted on said slide, and slide operating means for effecting feeding and withdrawing movements of the slide, of means for automatically limiting the feeding movement of the slide and tool at various depths and for starting the withdrawing movement, and means for limiting the withdrawing movement and for effecting a feeding movement of the carriage.

22. In a machine for turning blanks, the combination with means for rotating a blank, a longitudinally movable carriage, a transversely movable slide mounted on said carriage, a cutting tool mounted on said slide, and means for feeding and withdrawing the slide and for feeding the carriage, of means for automatically limiting the feeding movement of the tool and slide after feeding to different depths to cut the blank to different diameters, said limiting means also serving to start the withdrawing movement of the carriage, and means for automatically limiting the withdrawing movement of the slide and for starting the feeding movements of the carriage and the slide.

23. In a machine for turning blanks, the combination with means for rotating a blank, a longitudinally movable carriage, a transversely movable slide mounted on said carriage, a cutting tool mounted on said slide, and means for feeding and withdrawing the slide and for feeding the carriage, of means comprising a former member for automatically limiting the feeding movement of the tool and slide after feeding to different depths to cut the blank to different diameters, said limiting means also serving to start the withdrawing movement of the carriage, means for limiting the withdrawing movement of the slide and for starting the feeding movements of the carriage and the slide.

24. In a machine for turning blanks, the combination with means for rotating a blank, a longitudinally movable carriage, a transversely movable slide mounted on said carriage, a cutting tool mounted on the slide, and means for feeding and withdrawing the slide and for feeding the carriage, of a former member having a contour similar to the contour to be cut on the blank, a former pin mounted on said slide, means operated by said former member when the slide and tool have been fed a predetermined distance for stopping the feeding movement of the slide and for starting the withdrawing movement, and means operative upon a predetermined withdrawal of the slide for stopping the withdrawing movement and for starting the feeding movements of the carriage and the slide.

25. In a machine for turning blanks, the combination with means for rotating a blank, a longitudinally movable carriage, a transversely movable slide mounted on said carriage, a cutting tool mounted on the slide, and means for feeding and withdrawing the slide and for feeding the carriage, of means controlled by the slide movement for stopping and starting the feeding and withdrawing movements of the slide and the feeding movement of the carriage.

26. In a machine for turning blanks, the combination with means for rotating a blank, a longitudinally movable carriage, a transversely movable slide mounted on the carriage, a cutting tool mounted on said slide, and means for feeding and withdrawing the slide and for feeding the carriage, of a former member having a contour similar to the contour to be cut on the blank, means comprising a member mounted on the slide for engaging the former member to limit the feeding movement of the slide and for starting the withdrawing movement of the slide, and means operated by the withdrawing movement of the slide for stopping the withdrawing movement and for starting the feeding movements of the carriage and the slide.

27. In a machine for turning blanks, the combination with means for rotating a blank, a longitudinally movable carriage, a transversely movable slide mounted on the carriage, a cutting tool mounted on said slide, means for feeding and withdrawing the slide and for feeding the carriage, and a clutch mechanism for selectively operating said means, of a former member having a contour similar to the contour to be cut on the blank, means comprising a former pin on the slide for engaging the former member during the feeding movement of the slide to operate said clutch mechanism to stop such movement and start a withdrawing movement, and means operated upon a predetermined withdrawal of the slide for operating said clutch mechanism to stop the withdrawing movement and to start the feeding movements of the carriage and the slide.

28. In a machine for turning blanks, the combination with means for rotating a blank, a longitudinally movable carriage, a transversely movable slide mounted on said carriage, and a cutting tool mounted on the slide, of means for feeding and for withdrawing said slide, means operative near the end of the feeding movement of the slide for controlling said slide-operating means to stop the feeding movement and to start the withdrawing movement, and means operative near the end of the withdrawing movement for controlling the slide-operating means to stop the withdrawing and to start the feeding operation.

29. In a machine for turning blanks, the combination with means for rotating a blank, a longitudinally movable carriage, a transversely movable slide mounted on said carriage, a cutting tool mounted on said slide, and slide-operating means for effecting either a feeding or a withdrawing movement of the slide, of means operated by the feeding movement of the slide for controlling the slide-operating means to stop the feeding operation and to start the withdrawing movement, and a cam member operated by the withdrawing movement of the slide for controlling the slide-operating means to stop the withdrawing movement and to start the feeding movement, and means operated by said cam member for effecting feeding movement of the carriage.

30. In a machine for turning blanks, the combination with means for rotating a blank, a longitudinally movable carriage, a transversely movably slide mounted on said carriage, and a cutting tool mounted on the slide, of slide-operating means for feeding and for withdrawing the slide with respect to the blank, a former member having a contour similar to the contour to be cut on the blank, means operative near the end of slide feeding movement and controlled by the former member for governing the slide-operating means to stop the feeding operation and to start the withdrawing operation, and means operative near the end of the withdrawing operation for governing the slide operating means to stop the withdrawing movement and to start the feeding movement.

31. In a machine for turning blanks, the combination with means for rotating a blank, a longitudinally movable carriage, a transversely movable slide mounted on the carriage, a cutting tool mounted on said slide, and slide-operating means for effecting either a feeding or a withdrawing movement of the slide, of a former member having a contour similar to the contour to be cut on the blank, means operated near the end of the slide feeding movement and controlled by said former member for governing the slide-operating means to stop the feeding movement and to start the withdrawing operation, and means operative near the end of the withdrawing movement of the slide for controlling the slide-operating means to stop the withdrawing movement and to start the feed movement, said last named means also serving to effect a feeding movement of the carriage.

32. In a machine for turning blanks, the combination with means for rotating a blank, a carriage movable longitudinally with respect to the blank, a transversely movable slide, a cutting tool mounted on said slide, a set of gearing for effecting a feeding movement of the slide, a set of gearing for withdrawing the slide, and a clutch mechanism for operatively connecting either set of gearing to the slide, of means operated by the feeding movement of the slide for operating said clutch mechanism to stop the feeding movement and to start the withdrawal movement, a cam member operated by the withdrawing movement of the slide for operating the clutch mechanism to stop the withdrawing movement and to start the feeding movement, and means operated by the cam member for effecting feeding movement of the carriage between the feeding and withdrawing movement of the slide.

33. In a machine for turning blanks, the combination with means for rotating a blank, a carriage movable longitudinally with respect to the blank, a transversely movable slide mounted on said carriage, a cutting tool mounted on said slide, two sets of gearings for respectively feeding and withdrawing said slide, a clutch mechanism for operating one or the other of said sets of gearings, and means comprising a cam member for effecting a feeding movement of the carriage and for operating said clutch, of mechanism to stop the feeding movement of the slide and start the withdrawing movement of a former member having a contour similar to the contour to be cut on the blank, a former pin mounted on said slide, trip mechanism released by said former pin upon engagement with the former member during feeding movement of the slide for operating said clutch mechanism to stop the slide feeding movement and start the slide withdrawal, means operated upon a withdrawal of the slide to a predetermined point for operating said cam member.

34. In a machine for turning blanks, the combination with means for rotating a blank, a transversely movable slide, means comprising a clutch shaft for operating said slide, and a clutch member mounted on said clutch shaft, of two sets of gearing selectively connected to the clutch shaft by said clutch member for feeding and withdrawing the slide, means for automatically effecting a longitudinal feeding movement upon withdrawal of the slide, and means controlled by the slide movement for operating said clutch member.

35. In a machine for turning blanks, the combination with means for rotating a blank, a transversely movable slide, a cutting tool mounted on said slide, a feed shaft for feeding and for withdrawing the slide, a clutch shaft connected to the feed shaft, and two sets of gearing, of a clutch member mounted on the clutch shaft for connecting one or the other of said sets of gearing to the clutch shaft to feed or to withdraw the slide, means for automatically effecting a longitudinal feeding movement upon withdrawal of the slide and means controlled by the slide movement for operating said clutch member.

36. In a machine for turning blanks, the combination with blank-rotating means, a transversely movable slide, means comprising a clutch shaft connected to said slide for giving it a feeding and a withdrawing movement, and means for automatically effecting a longitudinal feeding movement upon withdrawal of the slide, of two gear wheels rotatably mounted on said clutch shaft and connected to said blank-rotating means, and a clutch member keyed to and slidably mounted on said shaft, said clutch member serving to connect one or the other of said gear wheels to the clutch shaft for feeding or for withdrawing said slide.

37. In a machine for turning blanks, the combination with blank-rotating means, a transversely movable slide, means comprising a clutch shaft connected to said slide for giving it a feeding and a withdrawing movement, and means for automatically effecting a longitudinal feeding movement upon withdrawal of the slide, of two gear wheels rotatably mounted on said clutch shaft and connected to said blank-rotating means, a clutch member keyed to and slidably mounted on said shaft, said clutch member serving to connect one or the other of said gear wheels to the clutch shaft for feeding or for withdrawing said slide, and means for varying the speed of one of said gear wheels for varying the feeding movement of the slide.

38. In a machine for turning blanks, the combination with blank-rotating means, a transversely movable slide, means comprising a clutch shaft connected to said slide for giving it a feeding and a withdrawing movement, and means for automatically effecting a longitudinal feeding movement upon withdrawal of the slide, of two gear wheels rotatably mounted on said clutch shaft and connected to said blank-rotating means, a clutch member keyed to and slidably mounted on said shaft, said clutch member serving to connect one or the other of said gear wheels to the clutch shaft for feeding or for withdrawing said slide, means for varying the speed of one of said gear wheels for varying the feeding movement of the slide, and means for controlling the clutch in accordance with the movement of the slide.

39. In a machine for turning blanks, the combination with blank-rotating means, a transversely movable slide, a cutting tool mounted on said slide, means comprising a clutch shaft connected to the slide for giving the slide a feeding and a withdrawing movement, and a former member having a contour similar to the contour to be cut on the blank, of two gear wheels rotatably mounted on said shaft and connected to said blank-rotating means, a clutch member mounted on said shaft for connecting one or the other of said gear wheels to said shaft for giving the slide a feeding or a withdrawing movement, and means controlled by the slide movement and limited by said former member for operating said clutch member.

40. In a machine for turning blanks, the combination with blank-rotating means, a transversely movable slide, a cutting tool mounted on said slide, means comprising a clutch shaft connected to the slide for giving the slide a feeding and a withdrawing movement, and a former member having a contour similar to the contour to be cut on the blank, of two gear wheels rotatably mounted on said shaft and connected to said blank-rotating means, a clutch member mounted on said shaft for connecting one or the other of said gear wheels to the shaft for giving the slide a feeding or a withdrawing movement, means controlled by the slide movement and limited by said former member for operating said clutch member, and means for automatically effecting a longitudinal feeding movement of the slide after each feeding and withdrawing movement thereof.

41. In a machine for turning blanks, the combination with blank-rotating means, a transversely movable slide, a cutting tool mounted on said slide, means comprising a clutch shaft connected to the slide for giving it a feeding and a withdrawing movement, two gear wheels rotatably mounted on said shaft and each connected to the blank-rotating means, a clutch member mounted on said shaft between said two gear wheels, and a former member having a contour similar to the contour to be cut on the blank, of means controlled by the former member for limiting the feeding movement and for operating the clutch member to withdraw the slide, and means operative upon a predetermined withdrawal of the slide for operating the clutch member to stop the withdrawal of the slide and to start the feeding movement.

42. In a machine for turning blanks, the combination with means for rotating a blank, a transversely movable slide, a cutting tool mounted on said slide, and means comprising a clutch member for effecting either a feeding or a withdrawing movement of the slide, of a cam member for operating said clutch member, and means operative upon a predetermined withdrawal of the slide for operating said cam member to control the clutch member to effect a feeding movement by the slide.

43. In a machine for turning blanks, the combination with blank-rotating means, a transversely movable slide, a cutting tool mounted on said slide, and means comprising a clutch member for effecting either a feeding or a withdrawing movement of the slide, of a cam member having a worm wheel attached thereto for operating said clutch member, a pin mounted on said worm wheel, a stop member for engaging said pin to hold the cam member and the clutch member in a set position during the withdrawing movement of the slide, means operated near the end of the withdrawing movement of the slide for releasing said stop member and for rotating said gear wheel, said cam member during the rotation thereof serving to operate said clutch member to stop the withdrawing movement and to start a feeding movement, and means operated near the end of the feeding movement of the slide for operating said clutch member to stop the feeding movement and to start the withdrawing movement.

44. In a machine for turning blanks, the combination with blank-rotating means, a transversely movable slide, a cutting tool mounted on said slide, and slide-operating means for effecting either a feeding or a withdrawing movement of the slide, of a cam member operative near the end of the slide withdrawing movement for so controlling the slide-operating means as to stop the withdrawing movement and to start the feeding movement of the slide, and means operative near the end of the feeding movement for controlling the slide-operating means to stop the feeding movement and to start the withdrawing movement.

45. In a machine for turning blanks, the combination with blank-rotating means, a transversely movable slide, a cutting tool mounted on said slide, and slide-operating means for effecting either a feeding or a withdrawing movement of the slide, of a cam member operative after a predetermined withdrawal of the slide for so controlling said slide-operating means as to stop the withdrawing movement and to start the feeding movement, a former member having a contour similar to the contour to be cut on the blank, and means operated by the former member near the end of the feeding movement of the slide for so controlling the slide-operating means as to stop the feeding movement and to start the withdrawing movement.

46. In a machine for turning blanks, the combination with blank-rotating means, a transversely movable slide, a cutting tool mounted on said slide, and slide-operating means for effecting either a transverse feeding or a withdrawing movement of the slide, of a cam member operative after a predetermined withdrawal of the slide for so controlling said slide-operating means as to stop the withdrawing movement and to start the feeding movement, means operated by the cam member for effecting a longitudinal feeding movement of the slide and the tool between the withdrawing and the transverse feeding movement of the slide, a former member having a contour similar to the contour to be cut on the blank, and means operated by the former member near the end of the transverse feeding movement of the slide for so controlling the slide-operating means as to stop the transverse feeding movement and to start the withdrawing movement.

47. In a machine for turning blanks, the combination with a cam member, a gear wheel connected to said cam member, a stop member for normally preventing rotation of the cam member, and means comprising a clutch mechanism for rotating the gear wheel, of a cam rod for operating the stop member to release said gear wheel and the cam member and for simultaneously operating said clutch mechanism to rotate the gear wheel and the cam member.

48. In a machine for turning blanks, the combination with a slide, a cutting tool mounted on said slide, a cam member, a gear wheel connected to said cam member, a stop member for preventing operation of the cam member when said slide is being operated in a predetermined direction, and means comprising a clutch mechanism for rotating said gear wheel, of a cam rod for operating the stop member to release said gear wheel and the cam member and for operating said clutch mechanism to rotate the gear wheel and the cam member, and means operated by said slide for operating said cam rod.

49. In a machine for turning blanks, the combination with blank-rotating means, a cutting tool, a slide carrying said cutting tool, and means comprising a clutch member for effecting a feeding and a withdrawing movement of the slide, of a cam member for controlling said clutch member, a gear wheel connected to said cam member, a pin mounted on said gear wheel, a clutch mechanism for connecting the gear wheel to a source of power to rotate the cam member, a cam rod having a stop member for engaging said pin to prevent rotation of the cam member, means for operating said clutch mechanism upon operation of cam rod, and means operated by the withdrawing movement of the slide for operating said cam rod to operate said stop member and to operate the clutch mechanism.

50. In a machine for turning blanks, the combination with a slide, a cutting tool mounted on the slide, means for moving the slide transversely and longitudinally with respect to the machine, a cam member for controlling the transverse movement of the slide, mechanism for rotating said cam member to control the transverse movement of the slide, and a stop member for preventing operation of the cam member when the slide is being operated in a predetermined transverse direction, of a cam rod for operating the stop member to release said cam member and for effecting operation of said cam-rotating mechanism, means operated by a predetermined movement of the slide for operating said cam rod, said cam member effecting a reversal in the direction of movement of the slide, and means controlled by the cam member for effecting a longitudinal movement of the slide.

51. In a machine for turning blanks, the combination with a slide, means comprising a clutch member for effecting either a feeding or a withdrawing movement of the slide transversely with respect to the machine, and a cam member for controlling the operation of said clutch member, of means, when the clutch member is in position for effecting a feeding movement of the slide, for exerting a force to move the clutch member into position for effecting a withdrawing movement of the slide, means operated by the feeding movement of the slide for releasing the clutch member to stop the feeding movement and to start the withdrawing movement, and means operated by the withdrawing movement of the slide for so controlling the cam member as to stop the withdrawing movement and to start the feeding movement.

52. In a machine for turning blanks, the combination with a slide, means comprising a clutch member for effecting either a feeding or a withdrawing movement of the slide transversely with respect to the machine, and a cam member for controlling the operation of said clutch member, of means, when the clutch member is in position for effecting a feeding movement of the slide, for exerting a force to move the clutch member into position for effecting a withdrawing movement of the slide, means operated by the feeding movement of the slide for releasing the clutch member to stop the feeding movement and to start the withdrawing movement, means operated by the withdrawing movement of the slide for so controlling the cam member as to stop the withdrawing movement and to start the feeding movement, and means operated by the cam member between the withdrawing and feeding movements of the slide for effecting a longitudinal feeding movement of the slide with respect to the machine.

53. In a machine for turning blanks, the combination with means for rotating a blank, a slide, a cutting tool mounted on the slide, means comprising a clutch member for effecting either a feeding movement or a withdrawing movement of the slide with respect to the machine, and a cam member for controlling the operation of said clutch member, of means held by a trip mechanism for exerting a force to move the clutch member into position for effecting a withdrawing movement when the clutch member is in position to effect a feeding movement, means operated by the feeding movement of the slide for releasing the trip mechanism to move the clutch member, such movement of the clutch member stopping the feeding movement and starting the withdrawing movement, and means operated by the withdrawing movement for operating the cam member to reverse the movement of the slide, and means operated by the cam member for effecting a longitudinal feeding movement by the slide.

54. In a machine for turning blanks, the combination with means for rotating a blank, a slide, a cutting tool mounted on the slide, means comprising a clutch member for effecting either a feeding movement or a withdrawing movement of the slide with respect to the machine, and a cam member for controlling the operation of said clutch member, of means held by a trip mechanism for exerting a force to move the clutch member into position for effecting a withdrawing movement when the clutch member is in position to effect a feeding movement, means operated by the feeding movement of the slide for releasing the trip mechanism to move the clutch member, such movement of the clutch member stopping the feeding movement and starting the withdrawing movement, means operated by the withdrawing movement for operating the cam member to reverse the movement of the slide, means operated by the cam member for effecting a longitudinal feeding movement by the slide, and means comprising a former member for so limiting each transverse feeding movement of the slide as to cut the blank to any predetermined contour.

55. In a machine for turning blanks, the combination comprising blank-rotating means, a slide, a cutting tool mounted on said slide, a clutch member, means operated by the clutch member for effecting a transverse feeding or withdrawing movement of the slide, means, when the clutch member is in a feeding position, for exerting a force on said clutch member tending to move it to the withdrawing position, a trip mechanism for holding said clutch member in the feeding position, and means operated by the slide near the end of the feeding movement for releasing said trip mechanism, of means comprising a cam member for moving the clutch member from the withdrawing position to the feeding position to be engaged by said trip mechanism, and means operated by the slide near the end of the withdrawing movement for operating said cam member.

56. In a machine for turning blanks, the combination comprising blank-rotating means, a slide, a cutting tool mounted on said slide, a clutch member, means operated by the clutch member for effecting a transverse feeding or withdrawing movement of the slide, means, when the clutch member is in a feeding position, for exerting a force on said clutch member tending to move it to the withdrawing position, a trip mechanism for holding said clutch member in the feeding position, and means operated by the slide near the end of the feeding movement for releasing said trip mechanism, of means comprising a cam member for moving the clutch member from the withdrawing position to the feeding position to be engaged by said trip mechanism, means operated by the slide near the end of the withdrawing movement for operating said cam member, and means operated by the cam member for effecting a longitudinal feeding movement by said slide.

57. In a machine for turning blanks, the combination with means for rotating a blank, a slide movable transversely with respect to the blank, and a cutting tool mounted on said slide, of means for feeding the tool transversely into engagement with the blank, a former member, a yieldable former pin mounted on the slide for engaging the former member to automatically limit the transverse feeding movement of the slide and the cutting tool, means for withdrawing the tool from engagement with the blank, and means for effecting a longitudinal feeding movement only when the tool is out of engagement with the blank.

58. In a machine for turning blanks, the combination with means for rotating a blank, a slide movable transversely with respect to the machine, and a former member mounted on the machine adjacent to said slide, of a former pin slidably mounted on the slide and resiliently forced a limited distance toward the former member, and means operated by said former pin for reversing the direction of movement of the slide upon engagement of the former pin with the former member.

59. In a machine for turning blanks, the combination with means for rotating a blank, a slide, a cutting tool mounted on said slide, a former member mounted adjacent to said slide, and a former pin having a limited movement on said slide and normally resiliently held in its extreme position toward the former member, of means for feeding the cutting tool toward the rotating blank, and means operated by the former pin upon engagement with the former member for limiting the depth of cut taken by said tool on the rotating blank.

60. In a machine for turning blanks, the combination with means for rotating a blank, a slide, a cutting tool mounted on said slide, a former member mounted adjacent to said slide, and a former pin having a limited movement on said slide and normally resiliently held in its extreme position toward the former member, of means for feeding the cutting tool toward the rotating blank, and means operated by the former pin upon engagement with the former member for limiting the depth of cut taken by said tool on the rotating blank and for reversing the direction of movement of the slide.

61. In a machine for turning blanks, the combination with means for rotating a blank, a slide, a cutting tool mounted on said slide, a former member mounted adjacent to said slide, and a former pin having a limited movement on said slide and normally resiliently held in its extreme position toward the former member, of means for feeding the cutting tool toward the rotating blank, means operated by the former pin upon engagement with the former member for limiting the depth of cut taken by said tool on the rotating blank and for reversing the direction of movement of the slide, and means automatically operated upon a predetermined withdrawal of the slide for stopping the withdrawing movement, for effecting a longitudinal feeding movement of the slide and tool and for starting a transverse feeding movement of the tool and slide.

62. In a machine for turning blanks, the combination with means for rotating a blank, a slide, a cutting tool mounted on said slide, a former member mounted on the machine adjacent to said slide, a former pin slidably mounted on said slide and adapted to engage the former member near the end of each transverse feeding movement of the slide, and slide-operating means for effecting transverse movements of the slide to feed and to withdraw the tool, of means operated by the former pin upon engagement with the former member for controlling said slide-operating means to stop the feeding movement and to start a withdrawing movement.

63. In a machine for turning blanks, the combination with means for rotating a blank, a slide, a cutting tool mounted on said slide, a former member mounted on the machine adjacent to said slide, a former pin slidably mounted on said slide and adapted to engage the former member near the end of each transverse feeding movement of the slide, and slide-operating means for effecting transverse movements of the slide to feed and to withdraw the tool, of means operated by the former member for controlling said slide-operating means to stop the feeding movement and to start a withdrawing movement, and means operative after a predetermined withdrawing movement of the slide for controlling said slide-operating means to stop the withdrawing movement and to start a feeding movement.

64. In a machine for turning blanks, the combination with means for rotating a blank, a slide, a cutting tool mounted on said slide, a former member mounted on the machine adjacent to said slide, a former pin slidably mounted on said slide and adapted to engage the former member near the end of each transverse feeding movement of the slide, and slide-operating means for effecting transverse movements of the slide to feed and to withdraw the tool, of means operated by the former pin upon engagement with the former member for controlling said slide-operating means to stop the feeding movement and to start a withdrawing movement, and means automatically operated near the end of the withdrawing movement of the slide for controlling said slide-operating means to stop the withdrawing movement and to start the feeding movement and for effecting a longitudinal feeding movement of the slide and tool between the withdrawing and the feeding movements.

65. The method of turning a metal blank, which consists in continuously rotating a blank, in providing a cutting tool in operative relation to the rotating blank, in reciprocating the cutting tool transversely with respect to the rotating blank and irrespective of the rotative position of the blank, and in effecting longitudinal feeding movements of the tool with respect to the blank only between the reciprocations and when the tool is out of engagement with the blank.

66. The method of turning a blank, which consists in rotating a blank, in providing a cutting tool in operative relation to the rotating blank, in variably reciprocating the cutting tool transversely with respect to the rotating blank and in accordance with any predetermined contour to effect cuts of various depths in the rotating blank, and in effecting longitudinal feeding movements of the tool with respect to the blank only between the reciprocating movements and when the tool is out of engagement with the blank.

67. The method of turning a blank, which consists in rotating a blank, in providing a cutting tool in operative relation to the blank, in providing a former member having a contour similar to the contour to be cut on the blank, in variably reciprocating the tool in accordance with the contour of the former member to effect cuts of various depths in the rotating blank, and in effecting longitudinal feeding movements of the tool only between the reciprocating movements and when the tool is out of engagement with the blank.

68. The method of turning a metal blank, which consists in rotating a blank, in providing a cutting tool in operative relation to the blank, in transversely feeding the cutting tool different depths to cut the blank to different diameters, in withdrawing the tool a predetermined distance after each feeding movement, and in feeding the tool longitudinally of the blank.

69. The method of turning a metal blank, which consists in rotating a blank, in providing a cutting tool in operative relation to the blank, in transversely feeding the cutting tool different depths to cut the blank to different diameters, in withdrawing the tool a predetermined distance after each feeding movement, and in effecting a longitudinal feeding movement of the tool at the end of each withdrawing movement.

70. The method of turning a blank, which consists in continuously rotating a metal blank, in providing a cutting tool in operative relation to the rotating blank, in providing a former member having a contour similar to the contour to be cut on the blank, in transversely feeding the tool varying depths into the blank in accordance with the contour of the former member, and in effecting longitudinal feeding movements of the tool with respect to the blank between the reciprocating movements thereof.

71. The method of turning a blank, which consists in continuously rotating a metal blank, in providing a cutting tool in operative relation to the rotating blank, in providing a former member having a contour similar to the contour to be cut on the blank, in feeding the tool transversely with respect to the blank and limiting such feeding movement in accordance with the contour of the former member, in initiating a transverse withdrawal movement of the tool to a predetermined distance from the blank axis after each transverse feeding movement, and in effecting a longitudinal feeding movement of the tool after each withdrawal.

72. The method of turning a blank, which consists in continuously rotating a metal blank, in providing a cutting tool in operative relation to the rotating blank, in intermittently feeding the tool longitudinally of the blank and irrespective of the rotative position of the blank, in transversely feeding the blank varying depths and in withdrawing the tool to a set position, said transverse feeding movements being varied to cut the blank to any predetermined contour and the transverse feeding and withdrawing movements being effected between the intermittent longitudinal feeding movements of the tool.

73. The method of turning a blank, which consists in rotating a blank, in providing a cutting tool in operative relation to the blank, in providing a former member having a contour similar to the contour to be cut on the blank, in providing a yieldable former pin connected to the cutting tool, in effecting feeding movements of the cutting tool into the blank depths which are limited by the former pin yieldingly engaging the former member, in effecting a withdrawing movement of the tool upon engagement of the former pin with the former member, and in effecting a longitudinal feeding movement of the cutting tool after each withdrawal movement.

74. The method of turning a blank, which consists in continuously rotating a blank, in providing a cutting tool in operative relation to the blank, in providing a former member having a contour similar to the contour to be cut on the blank, in providing a yieldable former pin connected to the cutting tool, in effecting transverse feeding movements of the cutting tool into the blank depths which are limited by the former pin yieldingly engaging the former member, in effecting a withdrawing movement of the tool upon engagement of the former pin with the former member, in stopping each withdrawal movement a set distance from the blank axis, and in effecting a longitudinal feeding movement of the tool after each withdrawal movement.

75. The method of turning a blank, which consists in rotating a blank, in providing a cutting tool in operative relation to the blank, in providing a former member having a contour similar to the contour to be cut on the blank and a yieldable former pin connected to the cutting tool, in transversely reciprocating the tool with respect to the rotating blank, in varying the reciprocating movements of the tool by the engagement of the former pin with the former member, and in effecting longitudinal feeding movements of the tool between the reciprocating movements thereof.

76. The method of turning a blank, which consists in rotating a blank, in providing a cutting tool in operative relation to the rotating blank, in intermittently feeding the cutting tool longitudinally with respect to the rotating blank, and in effecting variable transverse reciprocating movements between the cutting tool and the rotating blank in accordance with any predetermined contour to be cut on the blank, said reciprocating movements being effected between the intermittent longitudinal feeding movements of the cutting tool.

77. The method of turning a blank, which consists in continuously rotating a blank, in providing a cutting tool in operative relation to the rotating blank, in effecting intermittent longitudinal feeding movements between the cutting tool and the rotating blank, and in effecting variable transverse reciprocating movements between the cutting tool and the rotating blank to cut the blank to any predetermined contour, said reciprocating movements being effected between the intermittent longitudinal feeding movements.

78. The method of turning a blank, which consists in rotating a blank, in providing a cutting tool in operative relation to the rotating blank, in effecting intermittent longitudinal feeding movements between the cutting tool and the rotating blank irrespective of the rotative position of the blank, in effecting transverse feeding movements between the tool and the rotating blank, said transverse movements being effected between the longitudinal movements, and in varying the transverse feeding movements in accordance with the contour of the former member having a contour similar to the contour to be cut on the blank.

79. The method of turning a blank, which consists in rotating a blank, in providing a cutting tool in operative relation to the blank, in automatically variably reciprocating the cutting tool transversely with respect to the rotating blank and in accordance with any predetermined contour to effect cuts of various depths in the rotating blank, and in automatically effecting feeding movements of the tool longitudinally with respect to the rotating blank, during the reciprocating movement of the tool cutting is effected only on the movement of the tool toward the blank.

80. The method of turning a blank, which consists in rotating a blank, in providing a cutting tool in operative relation to the blank, in providing a former member having a contour similar to the contour to be cut on the blank, in automatically reciprocating the tool in accordance with the contour of the former member to effect cuts of various depths in the rotating blank, and in automatically effecting longitudinal feeding movements of the tool between the reciprocating movements thereof.

81. The method of turning a blank, which consists in rotating a blank, in providing a cutting tool in operative relation to the blank, in automatically transversely feeding the cutting tool different depths to cut the blank to different diameters, in automatically withdrawing the tool a predetermined distance after each feeding movement, and in automatically effecting a longitudinal feeding movement of the tool at the end of each withdrawing movement.

82. The method of turning a blank, which consists in rotating a blank, in providing a cutting tool in operative relation to the rotating blank, in automatically effecting intermittent longitudinal feeding movements between the cutting tool and the rotating blank, and in automatically effecting variable transverse reciprocating movements between the cutting tool and the rotating blank to cut the blank to any predetermined contour, said reciprocating movements being effected between the intermittent longitudinal feeding movements.

83. The method of turning a blank, which consists in rotating a blank, in providing a cutting tool in operative relation to the rotating blank, in automatically effecting intermittent longitudinal feeding movements between the cutting tool and the rotating blank irrespective of the rotative position of the blank, in automatically effecting transverse feeding movements between the tool and the rotating blank, said transverse movements being effected between the longitudinal movements, and in automatically varying the transverse feeding movements in accordance with the contour of a former member having a contour similar to the contour to be cut on the blank.

In testimony whereof, I hereto affix my signature.

FRIEDERICH MÜLLER.